Nov. 18, 1924.

N. CALBECK

ANIMAL TRAP

Filed Dec. 3, 1923

1,515,590

Inventor:
Newton Calbeck
By Louis C. Vanderlip,
Att'y.

Patented Nov. 18, 1924.

1,515,590

UNITED STATES PATENT OFFICE.

NEWTON CALBECK, OF NAPPANEE, INDIANA.

ANIMAL TRAP.

Application filed December 3, 1923. Serial No. 678,326.

*To all whom it may concern:*

Be it known that I, NEWTON CALBECK, a citizen of the United States, residing in Nappanee, county of Elkhart, State of Indiana, have invented certain new and useful Improvements in Animal Traps, of which the following is a specification.

This invention relates to animal traps, and especially to the trap-door type of traps for catching rats.

An object of my invention is to provide a simple and improved type of trap-door animal trap adapted to be applied to a barrel, or the like.

Another object of the invention is to provide an animal trap of the trap-door type in which an electromagnet is used to prevent movement of the trap-door.

A third object of the invention is to provide a trap of the character described in which an electromagnet normally retains the trap-door against tilting movement and in which means are provided for detaching the trap-door from the magnet to precipitate the animal into the trap.

Other objects of the invention are mentioned and described herein.

Figure 1:
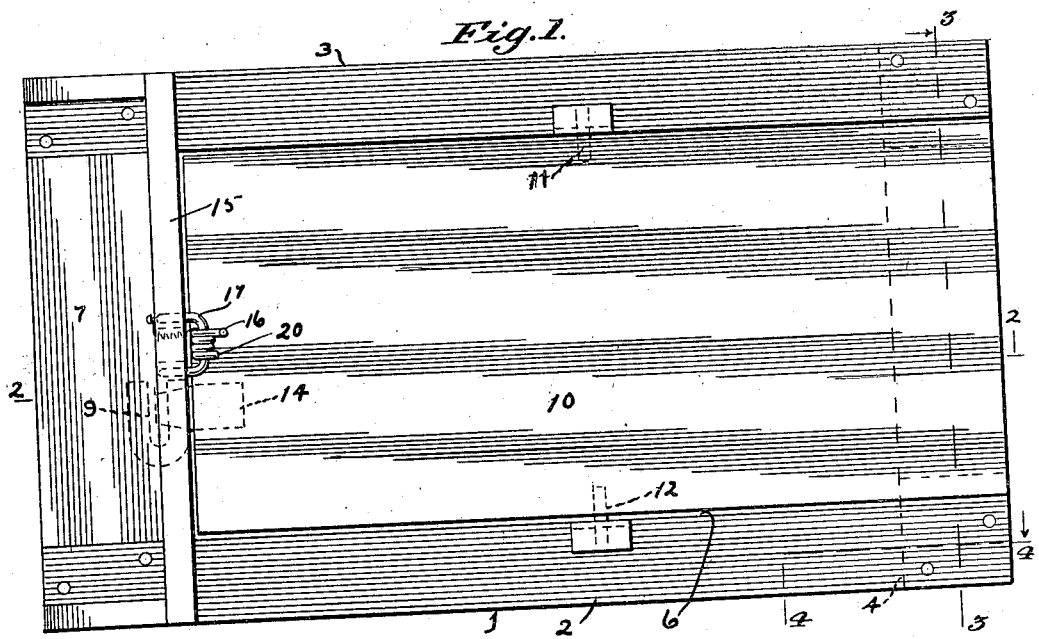
Figure 2:
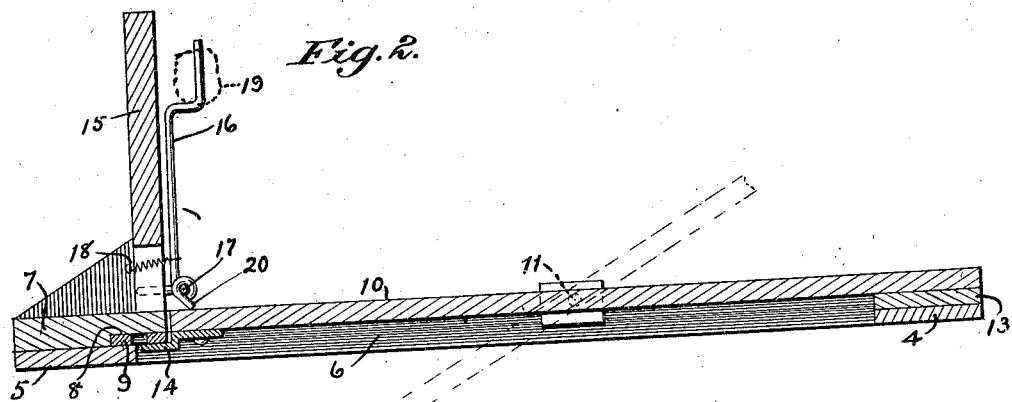
Figure 5:
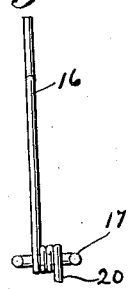
Figure 3:
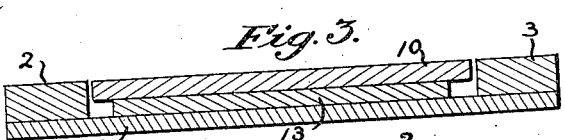
Figure 4:

The preferred embodiment of my invention is illustrated in the accompanying drawing, in which Figure 1 is a top plan view of the trap; Fig. 2 is a section taken on the line 2—2 of Fig. 1; Fig. 3 is a section taken on the line 3—3 of Fig. 1; Fig. 4 is a section taken on the line 4—4; and Fig. 5 is a view in elevation of the bait carrier.

Similar numerals of reference indicate like parts throughout the several views on the drawing.

Referring to the drawing in detail, the numeral 1 indicates generally a trap frame which may be composed of the two parallel wood side bars 2 and 3 and the end bars 4 and 5 secured to the under side of said side bars at the opposite ends thereof to rigidly connect said bars together to form the trap-door opening 6 in said frame. A block 7 may be secured above the cross bar 5 and parallel therewith, which block may be provided with a recess 8 to contain the electromagnet 9 which may be clamped between said block and the bar 5 adjacent one end of the opening 6.

A trap-door 10, of rectangular formation, is tiltably mounted within the frame opening 6 and may be carried upon the oppositely disposed trunnion pins 11 and 12 which are suitably mounted in the frame side bars 2 and 3. A counter balance weight 13 may be secured to the under side of one end of the trap door 10 and is adapted to seat upon the cross bar 4 to bring the trap-door back to a horizontal position after said door has been tilted in any manner. A metal door retainer 14 is secured to the end of the door 10 and projects therefrom to engage the electromagnet 9, which attracts said retainer, whereby the door is confined in a horizontal position against casual tilting movement.

Numeral 15 indicates an upright wall element mounted in the frame 1 adjacent the magnet end of the opening 6 and transversely thereof. A bait holder 16 is tiltably mounted in an upright position upon the carrier bar 17 which is secured in the wall 15 adjacent the lower end thereof, a light coil spring 18 connected with said holder and anchored in said wall, normally holding said bait holder retracted upright and contiguous to said wall element. Any suitable bait 19 may be placed upon the upper end of the holder 16 to lure rats or other animals upon the trap-door 10.

The lower end of the bait holder 16 is provided with a toe 20 which projects angularly away from the wall 15 below the bar 17 into light engagement with the door 10, said toe being adapted to bear against the door when said bait holder is tilted away from the wall 15, whereby the retainer 14 is disengaged from the magnet 9.

In operation, my improved trap is placed over the open top end of a barrel, or other suitable receptacle—not shown—after being suitably baited. Normally, the trap door 10 is held in a horizontal position by the magnet 9 and the weight of a rat would be insufficient to disengage the retainer 14 from said magnet. But when the bait is attacked by the rodent and the holder 16 drawn away from the wall 15 the holder toe 20 bears downward against the door, pressing it downward and detaching the retainer from the electromagnet, whereby the rodent is precipitated into the barrel, or other receptacle.

I claim:—

1. An animal trap comprising a frame provided with a trap door; an electromagnet to prevent movement of the trap door;

and means operated by the animal to disengage the trap door from the electromagnet to cause movement of said trap door.

2. An animal trap comprising a frame provided with a trap door tiltably mounted therein; an electromagnet to prevent movement of the trap door; and means operated by the animal to disengage the trap door from the electromagnet to cause tilting movement of said trap door.

3. In animal trap comprising a frame provided with a tiltably mounted trap door; an electromagnet to prevent movement of the trap door; a bait holder; and means on the bait holder to disengage the trap door from the electromagnet when the animal actuates said bait holder.

4. An animal trap comprising a frame provided with a tiltably mounted trap door; an electromagnet to prevent tilting action of the trap door; a movable bait holder; and means actuated by movement of the bait holder to detach the trap door from the electromagnet.

In witness whereof I have hereunto affixed my signature this 1st day of December, 1923.

NEWTON CALBECK.